Oct. 27, 1925.
A. FRIEDERICI
BILLET AND BAR SHEARS
Filed Dec. 27, 1923
1,559,082
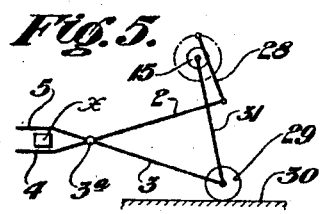
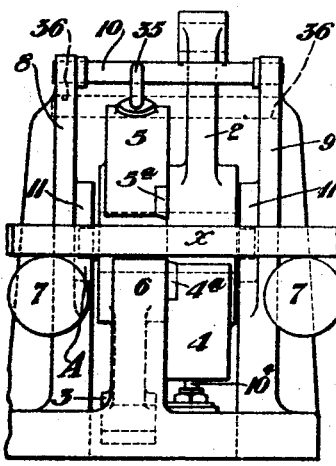
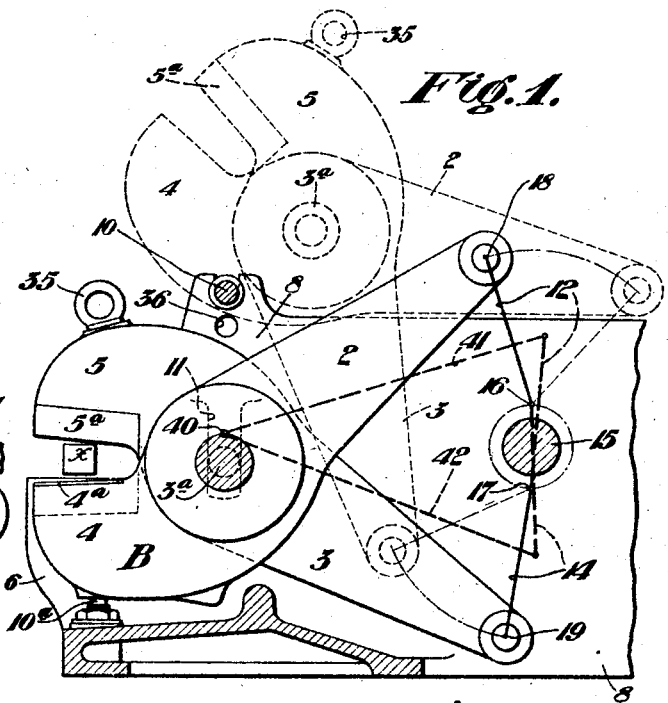
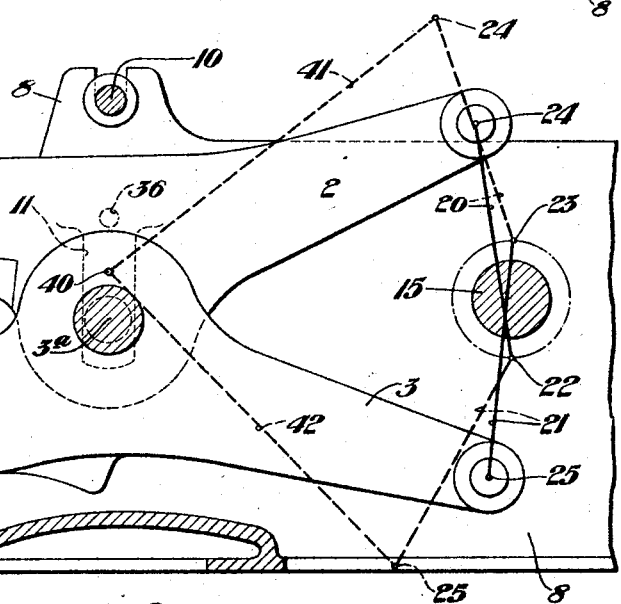
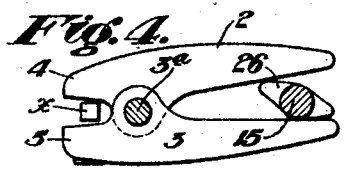
Witnesses:
Edwin Grust
Inventor:
AUGUST FRIEDERICI,
By: Richard D. Little
his Attorney.

Patented Oct. 27, 1925.

1,559,082

UNITED STATES PATENT OFFICE.

AUGUST FRIEDERICI, OF DUSSELDORF, GERMANY, ASSIGNOR TO MAX FRIEDERICI, OF STEUBENVILLE, OHIO.

BILLET AND BAR SHEARS.

Application filed December 27, 1923. Serial No. 682,931.

*To all whom it may concern:*

Be it known that I, AUGUST FRIEDERICI, a citizen of the Republic of Germany, and resident of Dusseldorf, Germany, have invented certain new and useful Improvements in Billet and Bar Shears, of which the following is a specification, and for which I filed an application for patent in the Republic of Germany on January 6, 1923.

This invention relates to shears and while not limited thereto, relates more particularly to billet and bar shears, and has for one of its objects the provision of shears of this class having a pair of blades or jaws, the lower one of which is adapted to move upwardly in the cutting operation.

Another object is to provide a shear of this class in which the up and down moved masses are reduced to a minimum, and the machine frame is not subjected to tension or bending.

A further object is to provide a shear of the class described in which the jaws, levers and accompanying parts may be swung up to an angular position above the roller table when it is desired to convey material, without shearing, along a table associated with the shear.

A still further object is to provide a shear having the novel arrangement, construction, and combination of parts described in the following specification and illustrated in the accompanying drawings.

In the drawings—

Figure 1 is a side elevation of one form of shear embodying my invention.

Figure 2 is a front elevation thereof.

Figures 3 and 4 are side elevations of slightly modified forms of shears embodying my invention.

Figure 5 is a diagrammatic elevation illustrating the manner in which a single eccentric may be used to operate the shear illustrated in Figures 1 and 2.

Referring more particularly to the drawings, the letter A designates a rolling feed table and B designates the shear as a whole.

The shear B comprises a pair of shear levers 2 and 3 which are pivotally connected intermediate their ends by a pivot pin $3^a$. The forward portion of the levers 2 and 3 terminate in shearing heads 4 and 5, respectively, carrying renewable blades $4^a$ and $5^a$, respectively.

A work support 6 is mounted between the rollers 7 of the roller table A, and a supporting structure, consisting of side plates 8 and 9, extends to one side of the table therefrom to support the shear levers and their operating mechanism. An adjustable stop $10^a$, which is mounted on the work support directly under the lower shear member 2, is adapted to limit the downward movement of the lower shear member. A suitable stiffening bar 10 is removably mounted between the side plates 8 and 9 to strengthen the supporting structure against side thrust.

Each of the side plates 8 and 9 is provided with a vertically disposed guideway 11, forming a bearing for the ends of the pivot pin $3^a$ which projects beyond the side faces of the shear levers 2 and 3.

In the shear construction of Figures 1 and 2, the levers 2 and 3 are crossed at the point of their pivotal connection with the pivot pin $3^a$, and have a tension operating mechanism consisting of links or levers 12 and 14 eccentrically mounted on a drive shaft 15 at 16 and 17 respectively, and pivotally connected at 18 and 19, respectively, to the rear ends of the shear levers 2 and 3.

In the shear construction of Figure 3 the lever members are pivoted together in parallel fashion, and therefore, have a compression operating mechanism composed of links or levers 20 and 21 eccentrically mounted on the drive shaft 15 as at 22 and 23, respectively, and pivotally connected as at 24 and 25, respectively, to the shear levers 2 and 3.

The shear construction of Figure 4 is the same as that of Figure 3, with the exception that a cam 26 is substituted for the levers or links 20 and 21 on the drive shaft 15 for operating the shear levers.

In the diagrammatic view of Figure 5 I have shown how the shear of Figures 1 and 2 may be operated by means of only one eccentrically mounted link or lever. In this construction a compression link or lever 28 is eccentrically connected to the shaft 15 and pivotally connected to the rear end of shear lever 2, while the shear lever 3 is provided at its rear end with a roller 29 adapted to move on a finished surface 30 on the base of the supporting structure and is connected to the shaft 15 by a tension rod or lever 31 to prevent bending.

In operation when the shaft 15 is rotated, the rear portion of the shear levers 2 and 3 are drawn together or forced apart, depending on whether they are pivotally connected in parallel or crossed relation. The jaw 4 carrying the lower knife or blade at first remains at rest on the support 10$^a$ and only the upper jaw 4 moves, until the work piece X resting on the work support 6 is reached, due to the mounting of the pivot pin 3$^a$ which allows said pin to move vertically in its guides 11. The pivot pin 3$^a$ will move downwardly a certain amount determined by the lever ratio and the thinner the work piece, the greater the distance the pin will move. As soon as the upper jaw engages the work, no further movement of the jaw is possible, since it presses the work against the work support 6. From this point only the lower jaw 4 moves and consequently moves upwardly. Now, since the levers, the jaws of which are considerably heavier than the rear portion, rest through the upper jaw on the work, the work is firmly clamped against the work support 6. By continuing the movement of the shear levers 2 and 3 the lower jaw will be moved up through the work to complete the shearing operation. When the shearing operation is completed, the center of the pivot 3$^a$ will be positioned at the point 40, while the levers 2 and 3 will be in the position indicated by dotted lines 41 and 42 respectively.

The movable pivot pin 3$^a$ of this shear performs several novel functions. The movement of this pin permits the shear jaws to automatically vary or adjust themselves vertically for various thicknesses of work, causes the shear jaws to maintain their cutting edges in approximate parallelism, and to thus prevent rake or sidewise drag of the material during the shearing operation. This novel pivotal mounting also eliminates practically all tension and bending stresses from the supporting structure and thus permits the use of a much lighter supporting structure, which is an important item when constructing apparatus for use in rolling mill tables, where space is at a premium.

Referring again to Figures 1, 2, and 3, I have shown the stiffener bar 10 as removable, and an eye 35 in the upper shear jaw. By removing the bar 10 and connecting a suitable lifting mechanism such as a crane to the eye 35, the shear levers 2 and 3 may be lifted bodily upward to a position clear of the roller table A. (See dotted position Figure 1.) Suitable apertures 36 are indicated in the side plates 8 and 9 which are adapted to receive a suitable bar (not shown) to support the raised shear levers in their elevated position. By elevating the shear levers the roller table A is left clear to operate as a conveyer only.

I claim—

1. In a shear, opposed shearing members, a work support, and mechanical means for operating said members to first clamp the work between one of said members and said work support and thereafter move the other of said members to shear the work.

2. In a shear, opposed shearing members, a work support, mechanical means for operating said members to first clamp the work between one of said members and said work support and thereafter move the other of said members to shear the work, and means for varying the capacity of said shear.

3. In a shear, opposed shearing members, a work support, mechanical means for operating said members to first clamp the work between one of said members and said work support and thereafter move the other of said members to shear the work, and means for automatically varying the capacity of said shear.

4. In a shear, opposed shearing members, a work support, mechanical means for operating said members to first clamp the work between one of said members and said work support and thereafter move the other of said members to shear the work, and means for minimizing the rake of said shear.

5. In a shear comprising a pair of lever members terminating at their forward ends in shearing heads, a pivot pin passing through said levers to form a pivotal connection, a work support, and means for operating said lever members to cause the upper of said shearing heads to first move downwardly to clamp the work between said shearing head and said work support and thereafter cause the lower of said shearing heads to move upwardly to shear the work.

6. In a shear comprising a pair of lever members terminating at their forward ends in shearing heads, a pivot pin passing through said levers to form a pivotal connection, a work support, means for operating said lever members to cause the upper of said shearing heads to first move downwardly to clamp the work between said shearing head and said work support and thereafter cause the lower of said shearing head to move upwardly to shear the work, and means for permitting vertical movement of said pivot pin and said connected levers relative to said work support during the shearing operation to vary the capacity of and minimize the rake of said shear.

7. In a shear comprising a pair of lever members terminating at their forward ends in shearing heads, a pivot pin passing through said levers to form a pivotal connection, a work support, means for operating said lever members to cause the upper of said shearing heads to first move downwardly to clamp the work between said shearing head and said work support and thereafter cause the lower of said shearing heads to move upwardly to shear the work, and means for automatically varying the vertical position of said pivot pin and said connected levers relative to said work support during the shearing operation to vary the capacity of and minimize the rake of said shear.

8. In a shear, pivotally connected shear levers, a stationary work support, means for first moving one of said shears to clamp the work piece between said shear and said work support and thereafter move the other shear to shear the work piece, and means whereby said pivotal connection will be automatically moved relative to the work piece during the shearing operation to maintain the shearing edges of said shearing levers in approximate parallelism.

9. In a shear, pivotally connected upper and lower shear levers, a stationary work support, means for first lowering the upper shear to clamp the work piece between said upper shear and said work support and thereafter move the lower shear upwardly to shear the work piece, and means whereby said pivotal connection will be automatically moved vertically relative to the work piece during the shearing operation to maintain the shearing edges of said levers in approximate parallelism.

10. In a shear, pivotally connected upper and lower shear levers, a stationary work support, eccentrically operated means for first lowering the upper shear lever to clamp the work piece between said upper shear lever and said work support and thereafter move the lower shear lever upwardly to shear the work piece, and means whereby said pivotal connection will be automatically moved relative to said work piece during the shearing operation to maintain the shearing edges of said shear levers in approximate parallelism.

11. In a shear, pivotally connected upper and lower shear levers, a stationary work support, eccentrically operated link mechanism for first lowering the upper shear lever to clamp the work piece between said upper shear lever and said work support and thereafter move the lower shear lever upwardly to shear the work piece, and means whereby said pivotal connection will be automatically moved relative to the work piece during the shearing operation to maintain the shearing edges of said shearing levers in approximate parallelism.

12. In a shear, pivotally connected upper and lower shear levers, a stationary work support, and eccentrically operated tensioning means for first lowering the upper shear lever to clamp the work piece between said upper shear lever and said work support and thereafter move the lower shear lever upwardly to shear the work piece, and means whereby said pivotal connection will be automatically moved during the shearing operation to maintain the shearing edges of said shear levers in approximate parallelism.

13. The combination with a rolling mill table, of a shear having opposed shearing members, means for operating said shearing members, a work support and supporting structure for said shearing members and their operating means, said shearing members being pivotally mounted in said supporting structure so as to permit said members to be swung into an angular elevated non-operative position above said table.

14. The combination with a rolling mill table, of a shear having opposed shearing members, means for operating said shearing members, a work support and supporting structure for said shearing members and their operating means, said shearing members being pivotally mounted in said supporting structure so as to permit said members to be swung into an angular elevated non-operative position above said table, and said supporting structure being provided with removable means for retaining said shearing members in an elevated position.

In testimony whereof I have hereunto set my hand.

AUGUST FRIEDERICI.